(12) United States Patent
Ungetheim et al.

(10) Patent No.: US 7,033,127 B2
(45) Date of Patent: Apr. 25, 2006

(54) POWERED, FOLDING RAMP FOR MINIVAN

(75) Inventors: Steven P. Ungetheim, El Mirage, AZ (US); William E. Gest, Fountain Hills, AZ (US); David H. Eaton, Jr., Scottsdale, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 406 days.

(21) Appl. No.: 09/844,876

(22) Filed: Apr. 27, 2001

(65) Prior Publication Data

US 2002/0159871 A1 Oct. 31, 2002

(51) Int. Cl.
*B60P 1/43* (2006.01)

(52) U.S. Cl. ........................ 414/537; 414/921
(58) Field of Classification Search ................ 414/537, 414/538, 921; 14/69.5, 71.1, 71.7; 317/375
See application file for complete search history.

(56) References Cited

U.S. PATENT DOCUMENTS

| | | | | |
|---|---|---|---|---|
| 4,068,770 A | * | 1/1978 | Boehringer | 414/537 |
| 5,391,041 A | * | 2/1995 | Stanbury et al. | 414/537 |
| 5,542,811 A | * | 8/1996 | Vartanian | 414/541 |
| 5,612,515 A | * | 3/1997 | Eisen | 177/126 |
| 5,871,329 A | | 2/1999 | Tidrick et al. | 414/537 |
| 6,078,156 A | * | 6/2000 | Spurr | 318/368 |
| 6,081,086 A | * | 6/2000 | Roth-Stielow et al. | 318/375 |
| 6,084,336 A | * | 7/2000 | Kawasaki et al. | 310/359 |
| 6,094,024 A | * | 7/2000 | Westlake | 318/375 |
| 6,175,204 B1 | * | 1/2001 | Calamatas | 318/375 |
| 6,179,545 B1 | * | 1/2001 | Petersen, Jr. et al. | 414/537 |
| 6,238,168 B1 | * | 5/2001 | Cohn et al. | 414/537 |
| 6,343,908 B1 | * | 2/2002 | Oudsten et al. | 414/537 |

* cited by examiner

*Primary Examiner*—Eileen D. Lillis
*Assistant Examiner*—Charles A. Fox
(74) *Attorney, Agent, or Firm*—Paul F. Wille

(57) ABSTRACT

A drive mechanism under the floor of a minivan is coupled to the folding ramp by a rotating arm linkage, also located beneath the floor. The extension of the folding ramp is partially controlled by dynamic braking, i.e. using the electric motor as a generator and coupling the motor to an electrical load.

9 Claims, 4 Drawing Sheets

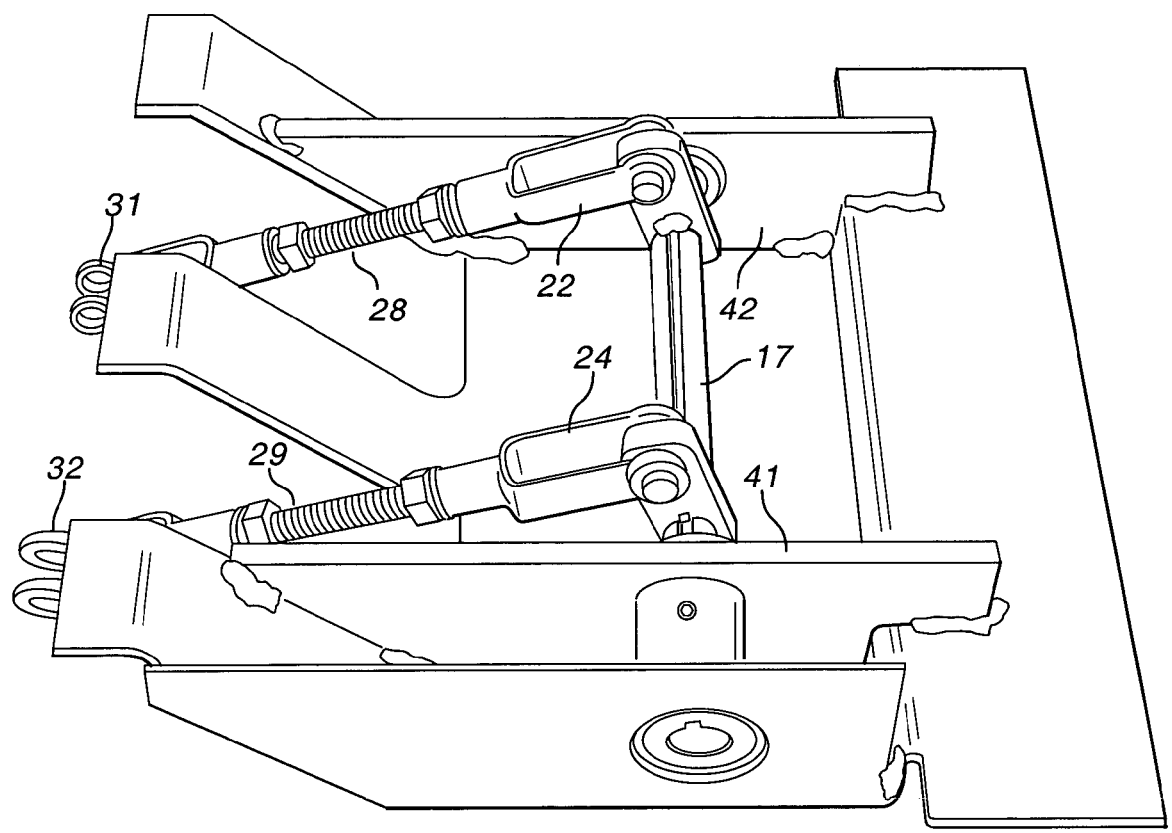
F I G. 3
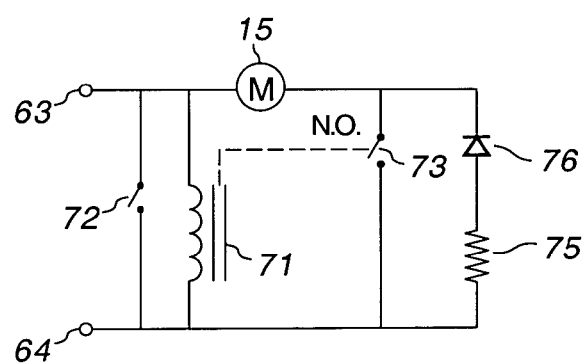
F I G. 5

POWERED, FOLDING RAMP FOR MINIVAN

BACKGROUND OF THE INVENTION

This invention relates to a wheelchair ramp for a minivan and, in particular, to a battery powered, folding ramp that is powered by a motor under the floor of the minivan.

It is known in the art to provide a ramp for enabling a person in a wheelchair to enter or leave a vehicle. Trucks, buses, and large vans have a high ground clearance and are typically provided with a lifting mechanism to augment a ramp, which would be too long or too steep otherwise. The ramp in such mechanisms merely provides a gradual transition from the ground to the height of a platform that is raised or lowered. A type of light truck known as a minivan has a lower ground clearance than larger vehicles. Thus, a ramp can be used without a lift and the ramp typically folds when stored.

In the prior art, minivans are typically provided with a battery powered, folding ramp having a motor located on one side of the sliding door adjacent the ramp. The motor is coupled to the ramp by gears or chain; e.g. see U.S. Pat. No. 5,871,329 (Tidrick et al.). The location for the motor reduces precious space within the cabin of the minivan and reduces the width of the ramp.

The Tidrick et al. patent also describes a mechanism for counterbalancing a folding ramp. Although the mechanism described works satisfactorily, the mechanism is mechanically complex and relatively expensive. Competing devices power the ramp down to the expected ground level, which may drive the ramp into the ground or stop the ramp just above ground level. On the one hand, such is necessary because the ground may be uneven or there may be a high curb, for example. On the other hand, an uncontrolled descent of a heavy metal ramp is undesirable.

In the prior art, it is generally assumed that a power failure occurs with a person in the minivan and that exiting the vehicle is all-important. Typically, a release mechanism is provided for extending the ramp after the door is opened. The ramp free-falls into an open position, creating a dangerous situation for someone standing near the open door. A folding metal ramp is heavy and cannot be handled by a person sitting in a wheelchair. Even for someone able to move about freely, a folding ramp may be difficult to handle and it is preferred that two people control the ramp.

In the event of a power failure, it is not simply a matter of extending the ramp manually. A manual release mechanism in the mechanical drive for the ramp must be re-set. This usually requires some re-assembly of the mechanical drive. Thus, for example, a power failure due to a blown fuse has the effect of stranding a wheelchair bound person or at least greatly delaying his travel while the system is restored to working order.

While there are many obvious solutions to the problem, such as a back-up power supply, one must realize that a ramp and a drive mechanism must fit an existing vehicle, i.e. a ramp is designed for the vehicle, not the other way around. A minivan is, by definition, a small van. Thus, most solutions to the problem are either too big, too expensive, or simply impractical. One wants to modify a minivan in a way that changes the finished appearance of the minivan as little as possible. Finding a location where a second battery, and the associated switching and charging apparatus, is both hidden and accessible is not easy in a minivan and is more difficult in a minivan that has already been heavily modified to accommodate a powered ramp. Similarly, any other solution to the problem must fit within commercially available vehicles without significantly affecting the space available for passengers or cargo.

In view of the foregoing, it is therefore an object of the invention to provide an electrically powered, folding ramp that has a controlled descent even when there is no electricity available.

Another object of the invention is to provide a compact drive mechanism for a folding ramp for a minivan, wherein the drive mechanism for the ramp is invisible from within the minivan.

A further object of the invention is to prevent a powered folding ramp from free-falling open in the event of a power failure.

Another object is to provide a controlled operation of a folding, powered ramp when power is interrupted.

SUMMARY OF THE INVENTION

The foregoing objects are achieved in this invention in which a drive mechanism under the floor of a minivan is coupled to the folding ramp by a rotating arm linkage, also located beneath the floor. The extension of the folding ramp is partially controlled by dynamic braking, i.e. using the electric motor as a generator and coupling the motor to an electrical load.

BRIEF DESCRIPTION OF THE DRAWINGS

A more complete understanding of the invention can be obtained by considering the following detailed description in conjunction with the accompanying drawings, in which:

FIG. 3 is an end view of a drive mechanism constructed in accordance with a preferred embodiment of the invention;

FIG. 5 is a schematic of a dynamic braking circuit constructed in accordance with the invention.

DETAILED DESCRIPTION OF THE INVENTION

Figure 1:
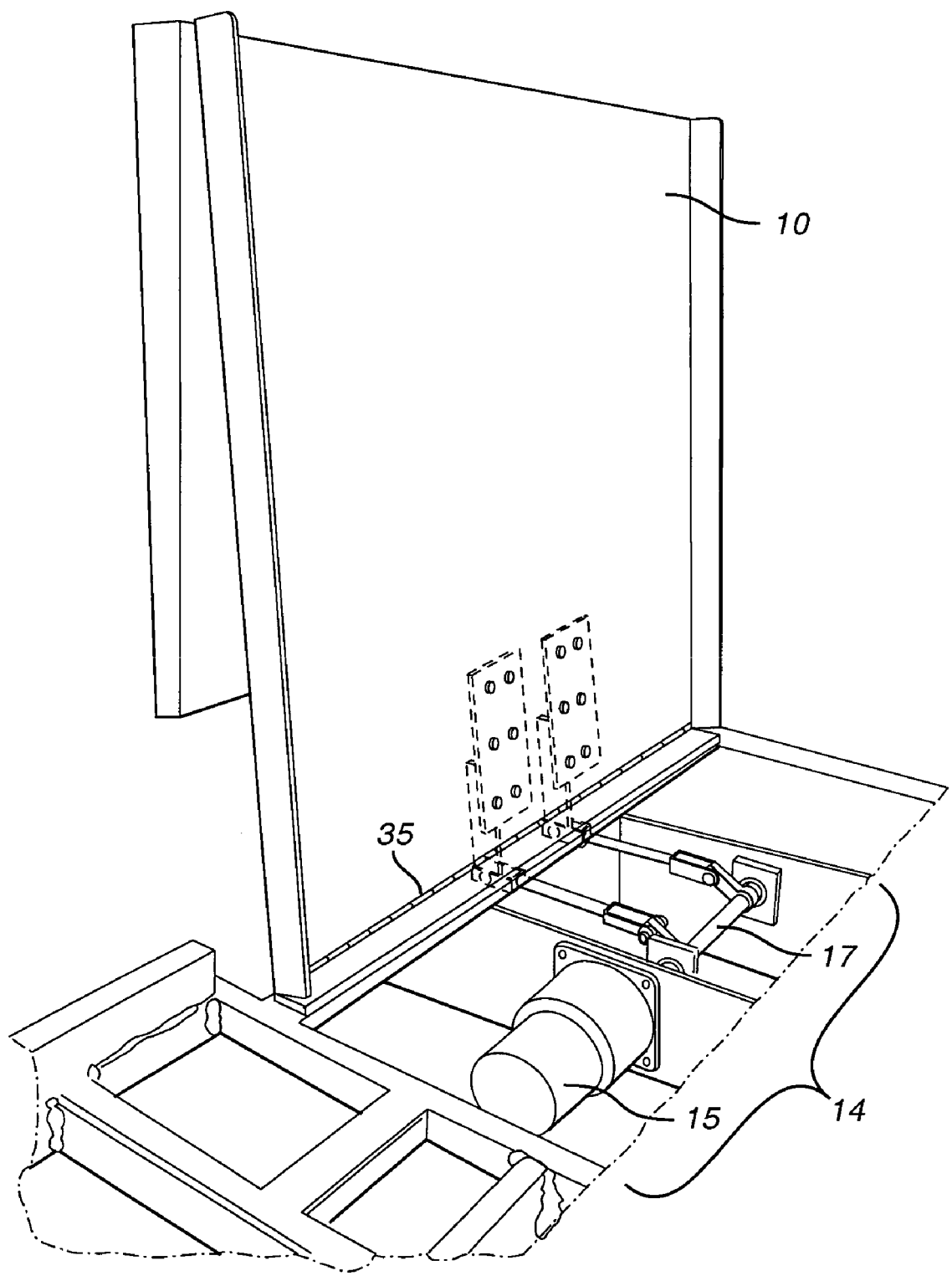
FIG. 1 is a perspective view of a folding ramp and the drive mechanism under the floor of a minivan.

FIG. 1 is a perspective view looking out the sliding door of a minivan having folding ramp 10 attached to the minivan and extending through the opening for the sliding door. Drive mechanism 14 is positioned under the floor and is mechanically coupled to ramp 10 for raising and lowering the ramp. A battery (not shown) provides electrical power for drive mechanism 14.

Figure 2:
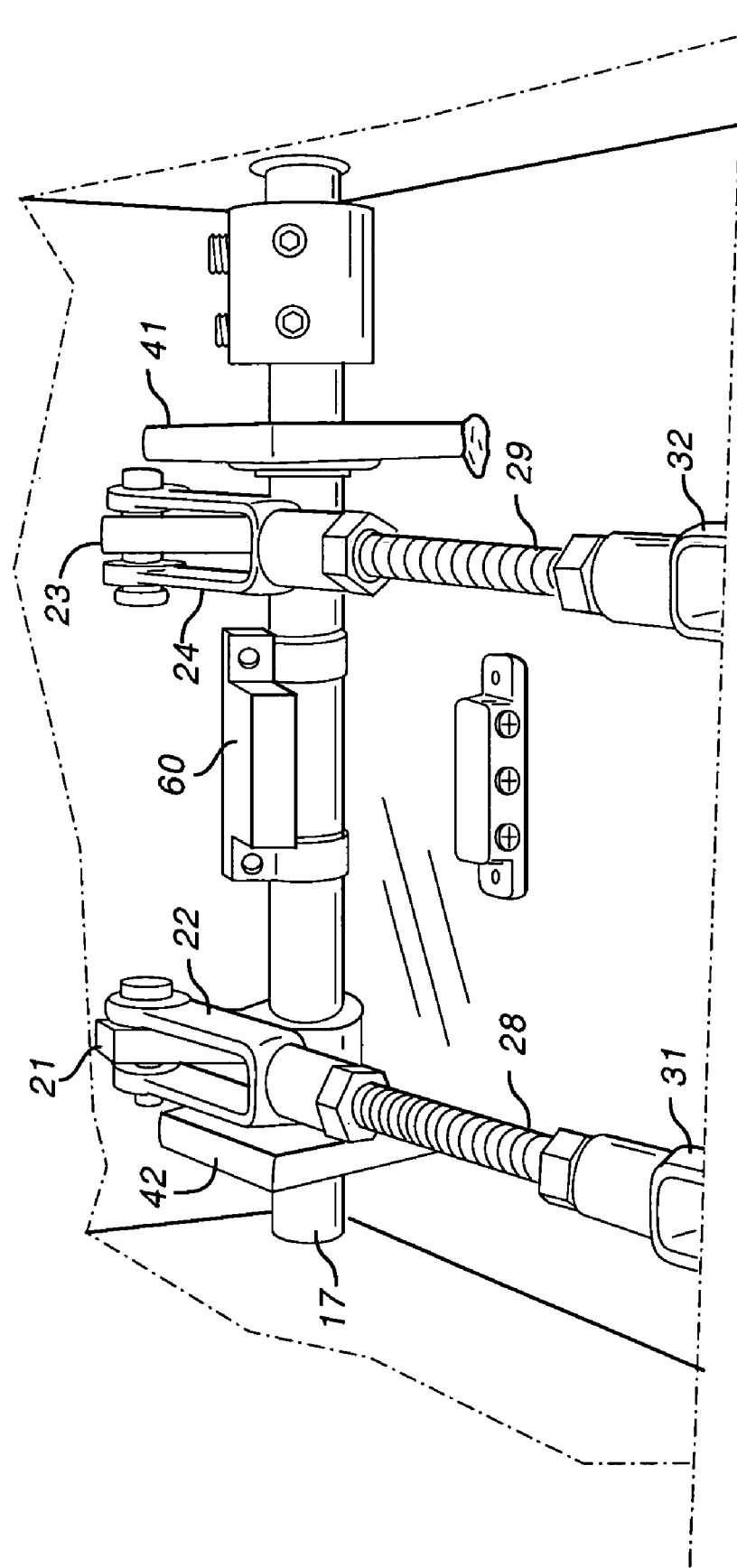
FIG. 2 is a side view of a drive mechanism constructed in accordance with a preferred embodiment of the invention.

Drive mechanism 14 includes gear motor 15 and drive shaft 17. The drive shaft is preferably journaled through plates at the gear box and at the free end to support the considerable off-axis forces applied to the drive shaft. The plates, in turn, are fastened to the frame of the minivan. The details of drive shaft 17 are best seen in FIGS. 2 and 3. Drive shaft 17 includes arm 21 having one end welded to drive shaft 17 and the other end drilled to receive a pin for attaching clevis 22. Arm 23 has one end welded to drive shaft 17 and the other end drilled to receive a pin for attaching clevis 24. Arms 21 and 23 are substantially parallel. Shaft 28 includes clevis 22 at one end and clevis 31 (FIG. 3) at the other end. Shaft 29 includes clevis 24 at one end and clevis 32 (FIG. 3) at the other end. Clevis 31 and clevis 32 are attached to brackets (not shown) on ramp 10 for rotating the ramp about hinge 35 (FIG. 1).

In operation, drive shaft 17 is supported at each end by bearings in bulkheads 41 and 42 (FIG. 3), which are adapted to be attached to the frame of a minivan. Because the throw of arms 21 and 23 is relatively short, and the throw on the brackets attached to the ramp is similarly short, substantial torque is applied to drive shaft 17 to operate the ramp. As drive shaft 17 rotates, the motion is converted to linear motion and back to rotary motion by the arms and brackets.

Figure 4:
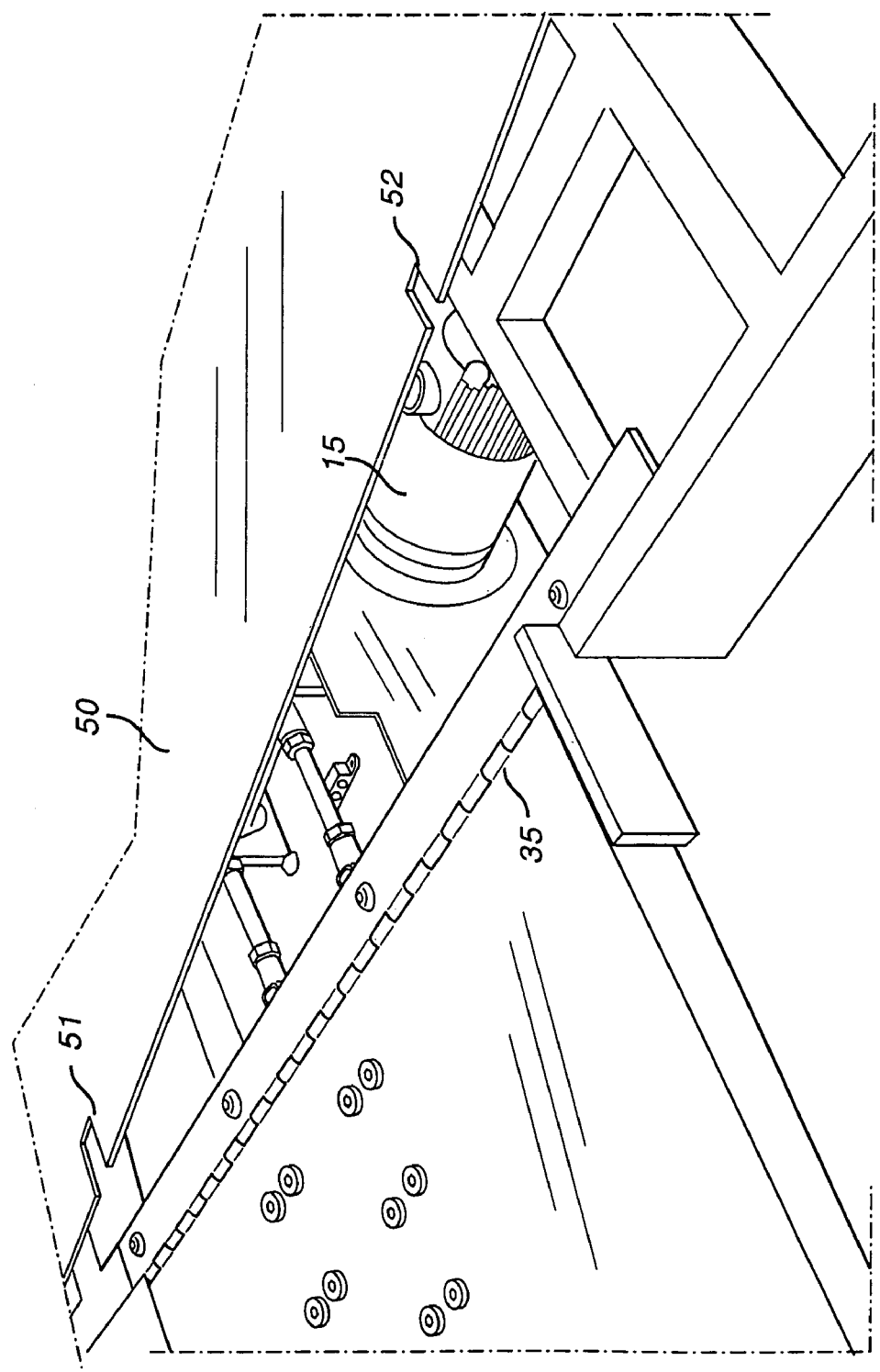
FIG. 4 is a perspective view showing the floor level of a minivan.

In one embodiment of the invention, drive mechanism 14 is about four inches in diameter and fits entirely under the floor of a minivan, as illustrated in FIG. 4. Floor plate 50 is completely flat and include only small slots 52 and 53 to accommodate a portion of ramp 10. None of the interior space of the minivan is taken up by the drive mechanism. This not only provides a much cleaner installation but also gives the user more room to maneuver a wheelchair within the small confines of a minivan.

In accordance with another aspect of the invention, dynamic braking is used to provide a controlled descent of the ramp. In FIG. 2, switch 60 is attached to drive shaft 17 and opens when the drive shaft turns to a certain position. When switch 60 opens, power is cut to gear motor 15 (FIG. 1) and ramp 10 turns the motor through the integral gearbox. Because the gearbox is now operating in a step-up gear ratio, there is significant mechanical drag on the descent of ramp 10. This drag is further enhanced by coupling a resistive load (not shown) to gear motor 15 to dissipate as heat the electrical energy being generated by the motor.

FIG. 5 is a partial schematic of the motor control circuitry showing the dynamic braking circuit for controlling the descent of the ramp. The battery in the minivan, or an auxiliary battery, is coupled to gear motor 15 through terminals 63 and 64. The polarity of the connection is reversed, depending upon whether the ramp (not shown in FIG. 5) is to be raised or lowered. When the transmission of the minivan is in drive or reverse, the motor leads are shorted, essentially locking motor 15. The shorting mechanism is not shown.

During power operation (with the transmission of the minivan in park or neutral), current is sent through motor 15 and relay 71, closing contacts 73. The ramp is lowered until switch 60 signals that the ramp is approximately ten inches above expected ground level. At this point, current is removed, switch 72 is closed, and motor 15 generates current that is dissipated through resistor 75, dynamically braking the descent of the ramp. To raise the ramp, switch 72 is opened, and the opposite polarity current is applied to terminals 63 and 64. Relay 71 closes contacts 73 and the ramp is raised.

During manual operation (with the transmission of the minivan in park or neutral), no current Is sent to the motor and switch 72 is closed. A person pushes or pulls the ramp to lower the ramp. Motor 15 generates current that is dissipated through resistor 75, dynamically braking the descent of the ramp. As a person lifts the ramp, motor 15 freewheels because diode 76 blocks current in the opposite direction from resistor 75. The gearbox presents nominal resistance but the leverage provided by the ramp easily overcomes this resistance.

The invention thus provides a compact drive mechanism for a folding ramp for a minivan, wherein the drive mechanism for the ramp is invisible from within the minivan. The drive mechanism is made more compact by providing dynamic braking, rather than a complex support structure, for the ramp. The invention provides an electrically powered, folding ramp that has a controlled descent even when there is no electricity available.

Having thus described the invention, it will be apparent to those of skill in the art that various modifications can be made within the scope of the invention. For example, the dynamic braking can be variable rather than constant, as described above. For example, plural loads can be switched into the circuit as the ramp descends to increase braking effect. Alternatively, the loads can be non-linear, e.g. an incandescent lamp. Further, one can rely on mechanical drag alone prior to applying dynamic braking when the ramp is more nearly vertical. Programmable logic, e.g. a microcontroller, can be used instead of fixed logic for controlling the operation of the ramp. Various position sensors can be used instead of switch 60 for opening the circuit to gear motor 15. Limit switches and various other safety items are not shown but would typically be included in the control mechanism for the ramp. A separate motor and gear box can be used instead of gearmotor 15 and a hydraulic pump and hydraulic motor can be used instead of an electric motor.

What is claimed as the invention is:

1. A minivan adapted for wheelchair access by a folding ramp having one end attached to the minivan by a hinge and by a drive mechanism including an electric motor having a rotor shaft coupled to said folding ramp for raising or lowering the ramp by rotating the folding ramp about said hinge, characterized in that:
   said drive mechanism is located beneath the floor of the minivan;
   said rotor shaft is substantially parallel with said hinge and includes a pair of arms coupled to said rotor shaft;
   said ramp includes a pair of brackets;
   said drive mechanism includes a pair of shafts extending underneath said hinge and coupling the arms to the brackets, whereby rotation of the rotor shaft causes rotation of the ramp about said hinge.

2. The minivan as set forth in claim 1 wherein said drive mechanism includes:
   a reduction gear having an input coupled to the rotor shaft and having an output shaft;
   a drive shaft coupled to said output shaft.

3. The minivan as set forth in claim 2 wherein said drive shaft is supported by at least two sets of bearings.

4. The minivan as set forth in claim 2 and further including a position sensing switch coupled to said drive shaft for interrupting power to said electric motor at a predetermined position of said ramp when the ramp is being extended.

5. The minivan as set forth in claim 4, wherein said drive shaft can drive said motor and further including
   a heat dissipating load;
   a braking switch for switching current from said motor to said heat dissipating load, thereby dynamically braking the folding ramp during extension.

6. The minivan as set forth in claim 2, wherein said drive shaft can drive said motor and further including
   a heat dissipating load;
   a braking switch for switching current from said motor to said heat dissipating load, thereby dynamically braking the folding ramp.

7. The minivan as set forth in claim 6 wherein said load brakes the fall of the ramp while the ramp is extended without applying power to said motor.

8. The minivan as set forth in claim 7 wherein said load includes a resistor for dissipating current generated by said motor.

9. The minivan as set forth in claim 8 and further including a diode in series with said resistor for blocking current through said resistor when said ramp is raised and the motor is driven in the opposite direction from when the ramp is lowered.

* * * * *